Oct. 25, 1938.   W. LONG   2,134,618
SAFETY DEVICE FOR MOTOR VEHICLES
Filed Sept. 7, 1937   2 Sheets-Sheet 2
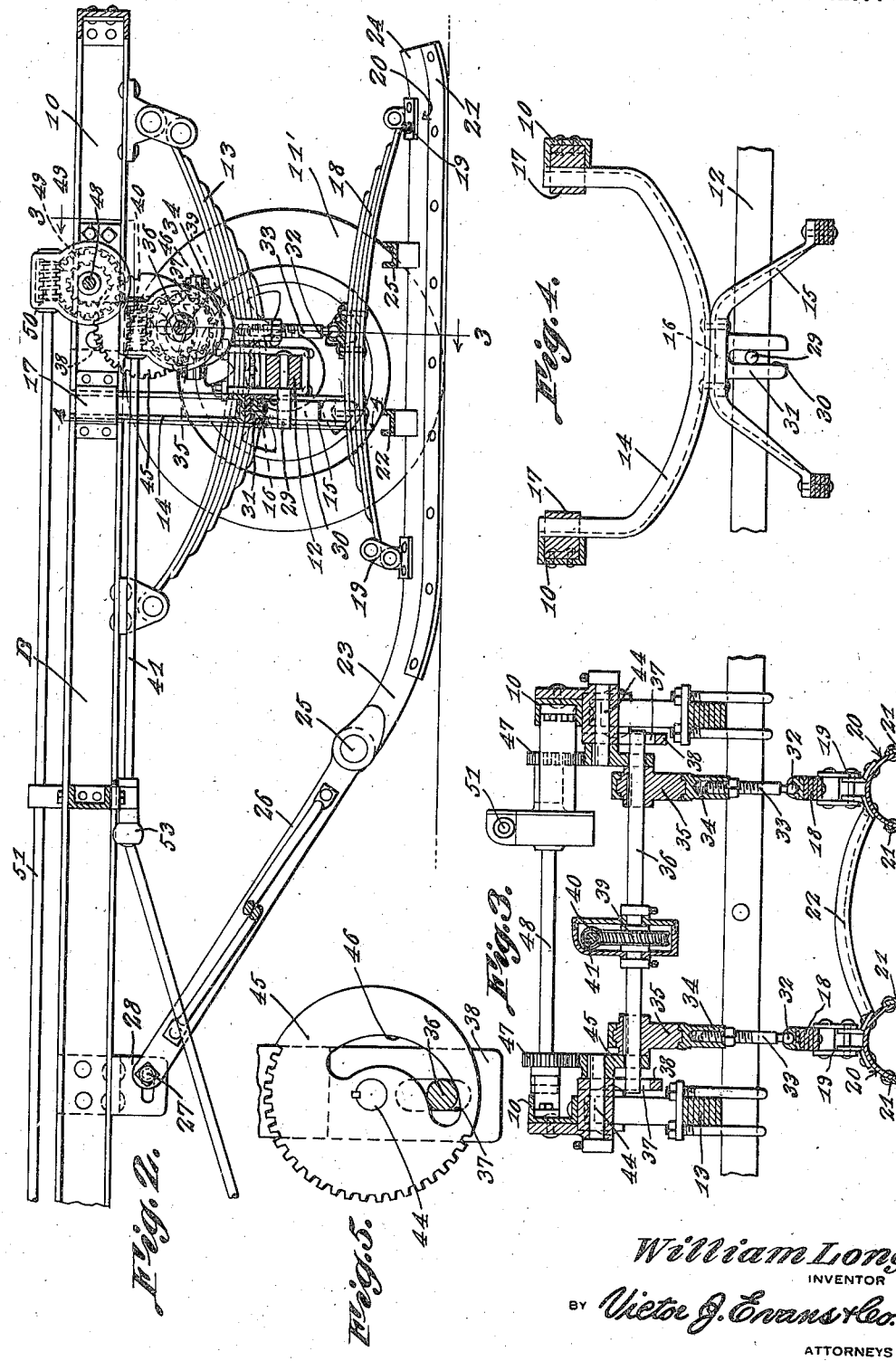
William Long,
INVENTOR
BY Victor J. Evans & Co.
ATTORNEYS Patented Oct. 25, 1938

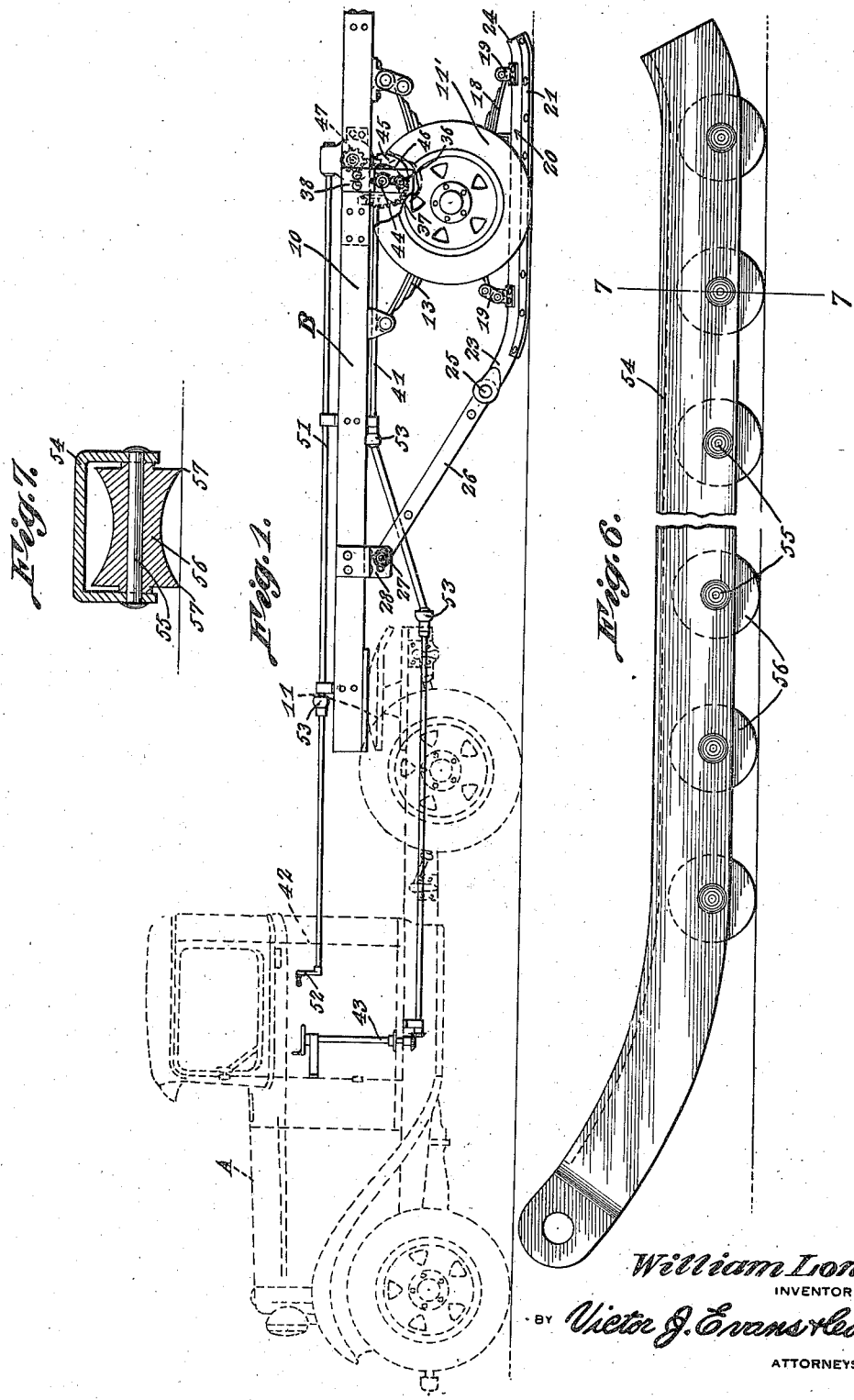

2,134,618

UNITED STATES PATENT OFFICE 2,134,618

SAFETY DEVICE FOR MOTOR VEHICLES

William Long, Waldo, Wis.

Application September 7, 1937, Serial No. 162,793

7 Claims. (Cl. 280—9)

The invention relates to a safety device for motor vehicles and more especially to a non-skid runner attachment for motor vehicles.

The primary object of the invention is the provision of an attachment of this character, wherein the same when trailing a motor vehicle and in operative position will avoid the skidding of such vehicle and in event that the vehicle should run off of the road, the same can be returned through the use of such attachment, being readily adjustable and under the control of an operator of the motor vehicle.

Another object of the invention is the provision of an attachment of this character, wherein during inclement weather in the use of the motor vehicle upon slippery highways or roadways, the same can be sustained thereon and will be prevented from skidding when applying the brakes of such vehicle, the attachment being novel in its entirety and is susceptible of adjustment in conformity with the load of the vehicle as well as to shift the same from operative to inoperative position or vice versa.

A further object of the invention is the provision of an attachment of this character, which is comparatively simple in its construction, thoroughly reliable and efficacious in operation, readily and easily handled, effective as a trailer for motor vehicles, preventing the skidding of the vehicle, enabling the restoring of the vehicle to the roadbed should the same leave such bed, strong, durable, and inexpensive to manufacture.

With these and other objects in view, the invention consists in the features of construction, combination and arrangement of parts as will be hereinafter more fully described, illustrated in the accompanying drawings, which disclose the preferred and modified forms of embodiment of the invention and pointed out in the claims hereunto appended.

In the accompanying drawings:

Figure 1 is a side elevation partly broken away showing the attachment constructed in accordance with the invention applied.

Figure 2 is an enlarged fragmentary vertical longitudinal sectional view thereof.

Figure 3 is a sectional view on the line 3—3 of Figure 2 looking in the direction of the arrows.

Figure 4 is a fragmentary vertical transverse sectional view through the attachment at the point of the truss members of Figure 2.

Figure 5 is a fragmentary side elevation of adjuncts of the attachment.

Figure 6 is a side elevation of a modified form of runner of the attachment.

Figure 7 is a sectional view on the line 7—7 of Figure 6.

Similar reference characters indicate corresponding parts throughout the several views in the drawings.

Referring to the drawings in detail, particularly Figures 1 to 5 inclusive, A designates generally a motor vehicle or motor truck which is of conventional type and with which is associated the attachment denoted generally at B and constituting the present invention.

The attachment comprises a chassis 10 which at its fore end has connection by a hitch 11 with the rear end of the vehicle A and trails the latter. The chassis 10 aft thereof is equipped with rubber tired traction wheels 11' having interposed between the axle 12 for said wheels and the said chassis 10 the usual bowed leaf vehicle springs 13, being conventionally shackled in place.

Arranged forwardly of the axle 12 are reversely bowed upper and lower trussed members 14 and 15, respectively, these being centrally united to each other at 16 and said upper member slidably fits guides 17 fixed to the chassis 10 while the lower member 15 has mounted therewith upwardly bowed leaf runner springs 18, these shackled at 19 to double bladed runners 20, the double blades being indicated at 21, and such runners 20 are in unity with upwardly arched cross braces 22. Each runner has an upwardly curved toe and heel 23 and 24, respectively, while the toes 23 have pivotal connection at 25 with a linking frame 26 slidably and pivotally connected at 27 in hangers 28 fixed to and depending from the forward portion of the chassis 10.

Medially of the axle 12 is a guide pin 29 received in an open slot 30 formed vertically and medially in a depending guide wing 31 centrally built with the lower member 15 so as to avoid lateral displacement of the runners 20 although allowing up and down motion thereto in cooperation with the springs 18 which absorb shocks and jars incident to the travel of the runners upon a roadbed or ground surface.

Swiveled at 32 intermediate of the springs 18 are adjustable jacks 33, these having eccentric straps 34 embracing major adjusting eccentrics 35 fixed to a turning shaft 36, its ends being received in elongated slots 37 vertically disposed in depending hangers 38 fixed to and directed downwardly from the chassis 10. The shaft 36 through the meshing worm gear 39 and worm screw 40, respectively, is turned and this worm screw is a part of an operating shaft 41 suitably journaled and extended into the cab 42 of the vehicle A and is actuated by a hand control 43 in convenient reach of the operator of said vehicle. By the turning of the shaft 36 the eccentrics 35 can be adjusted, these moving in unison through the shaft 36 common thereto for the raising and lowering of the runners 20.

Rotatably journaled at 44 next to the hangers 38, the journals 44 being suitably fitted with the chassis 10, are adjusting gears 45, these having eccentric slots 46 receiving the shaft 36 and such gears mesh with pinions 47 fixed to a turning shaft 48 suitably journaled in the chassis 10. The shaft 48 through the worm gear 49 and worm screw 50 meshing with each other can be turned, the worm screw 50 being a part of an actuating shaft 51 which extends into the cab 42 and has the hand control 52 for manual operation of the shaft. In this manner the extent of throw of the jack can be regulated and the said runners 20 can be adjusted in conformity with the load of the vehicle. It, of course, is understood that the runners can be lifted clear of the ground surface for the traction of the wheels 11' or such runners can be moved into biting engagement with the ground surface for antiskid operation.

Arranged in the shafts 41 and 51 are the usual flexible joints 53 responding to the vertical and lateral displacement of the attachment in its trailing position with respect to the vehicle A. The runners 20 are preferably upwardly and transversely arched bringing the blades 21 thereof in working position with respect to a ground surface.

In Figures 6 and 7 of the drawings there is shown a slight modification, wherein each runner 54 is of inverted substantially U-shaped or channeled formation having journaled at 55 transversely within the channeled side the concaved rollers 56. The concaved formation of each roller 56 effects a double knife edge 57 thereto for contact and engagement with a ground surface. This runner 54 may be a substitute for the runner 20.

From the foregoing it is thought that the construction and manner of operation of the attachment will be clearly understood and therefore a more extended explanation has been omitted. However, it is contemplated that changes, variations and modifications may be made in the structure as fall properly within the scope of the appended claims without departing from the spirit of the invention or sacrificing any of its advantages.

What is claimed is:

1. The combination of a chassis, an eccentric fitted with said chassis, a jack movable by said eccentric, a runner yieldably fitted with the jack, a second eccentric coacting with the jack, and means for operating each of said eccentrics independently of the other.

2. The combination of a chassis, an eccentric fitted with said chassis, a jack movable by said eccentric, a runner yieldably fitted with the jack, a second eccentric coacting with the jack, means for operating each of said eccentrics independently of the other, and flexible connection built with the chassis and connected with the advanced end of said runner.

3. The combination of a chassis, an eccentric fitted with said chassis, a jack movable by said eccentric, a runner yieldably fitted with the jack, a second eccentric coacting with the jack, means for operating each of said eccentrics independently of the other, flexible connection built with the chassis and connected with the advanced end of said runner, and truss means fitted with the chassis and connected with the runner and movable with respect to said chassis.

4. The combination of a chassis having a spring-supported axle and wheels carried by the latter, an eccentric fitted with the chassis, an adjustable jack movable by said eccentric, a runner connected to said jack, means for varying the position of the said eccentric, means for operating said eccentric, a spring included in the connection between the runner and the said jack, and truss means for said runner and having connection with the spring and the said chassis.

5. The combination of a chassis having a spring-supported axle and wheels carried by the latter, an eccentric fitted with the chassis, an adjustable jack movable by said eccentric, a runner connected to said jack, means for varying the position of the said eccentric, means for operating said eccentric, a spring included in the connection between the runner and the said jack, truss means for said runner and having connection with the spring and the said chassis, and a slidable coupling between the axle and said truss means.

6. The combination of a chassis having a spring-supported axle and wheels carried by the latter, an eccentric fitted with the chassis, an adjustable jack movable by said eccentric, a runner connected to said jack, means for varying the position of the said eccentric, means for operating said eccentric, a spring included in the connection between the runner and the said jack, truss means for said runner and having connection with the spring and the said chassis, a slidable coupling between the axle and said truss means, and a hitch for the chassis and connectible with a vehicle.

7. The combination of a chassis having a spring-supported axle and wheels carried by the latter, an eccentric fitted with the chassis, an adjustable jack movable by said eccentric, a runner connected to said jack, means for varying the position of the said eccentric, means for operating said eccentric, a spring included in the connection between the runner and the said jack, truss means for said runner and having connection with the spring and the said chassis, a slidable coupling between the axle and said truss means, a hitch for the chassis and connectible with a vehicle, and a flexible connection between the front end of the runner and said chassis.

WILLIAM LONG.